(12) United States Patent
Kuroda

(10) Patent No.: US 11,838,698 B2
(45) Date of Patent: Dec. 5, 2023

(54) DISPLAY APPARATUS, ITS CONTROL METHOD, AND STORAGE MEDIUM

(71) Applicant: CANON KABUSHIKI KAISHA, Tokyo (JP)

(72) Inventor: Hirofumi Kuroda, Tochigi (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/735,216

(22) Filed: May 3, 2022

(65) Prior Publication Data

US 2022/0368871 A1 Nov. 17, 2022

(30) Foreign Application Priority Data

May 17, 2021 (JP) .................. 2021-083177

(51) Int. Cl.
*H04N 9/31* (2006.01)
*H04N 23/63* (2023.01)

(52) U.S. Cl.
CPC ......... *H04N 9/3188* (2013.01); *H04N 9/3185* (2013.01); *H04N 9/3194* (2013.01); *H04N 23/632* (2023.01)

(58) Field of Classification Search
CPC .. H04N 9/3188; H04N 9/3185; H04N 9/3194; H04N 23/632; H04N 23/60; H04N 5/445; H04N 9/3182
See application file for complete search history.

(56) References Cited

U.S. PATENT DOCUMENTS 9,843,781 B1 12/2017 Furui
2013/0278779 A1* 10/2013 Hong ..................... H04N 7/147
348/E17.002

FOREIGN PATENT DOCUMENTS

JP 2017208677 A 11/2017

* cited by examiner

*Primary Examiner* — Yogesh K Aggarwal
(74) *Attorney, Agent, or Firm* — ROSSI, KIMMS & McDOWELL LLP

(57) ABSTRACT

A display apparatus includes a display unit, an acquiring unit configured to acquire a captured image generated by capturing a displayed image, which is displayed by the display unit, by an image pickup apparatus, and a control unit configured to cause the display unit to display the captured image together with or instead of the displayed image. The control unit causes the display unit to stop displaying the captured image when the image pickup apparatus captures the displayed image.

8 Claims, 7 Drawing Sheets

DISPLAY APPARATUS, ITS CONTROL METHOD, AND STORAGE MEDIUM

BACKGROUND OF THE INVENTION

Field of the Invention

The present invention relates to a display apparatus such as an image projection apparatus (projector) or a direct-view type display apparatus, and more particularly to a display apparatus having a function of displaying a captured image obtained by capturing a displayed image (display video).

Description of the Related Art

Some display apparatuses perform various correction processing using a captured image obtained by capturing a display video. Japanese Patent Laid-Open No. ("JP") 2017-208677 discloses a projector having a built-in camera and performing processing such as keystone distortion correction and color correction for a projected image using an image obtained by capturing the projected video with the camera.

The projector having the built-in camera as disclosed in JP 2017-208677 and a projector connected to an external camera can also display a captured image obtained by capturing a projected image with the camera on part of a projected video so as to allow a user to confirm the captured image. However, when imaging by the camera is periodically repeated, the user has to view an unnaturally captured image in which the past captured images are superimposed.

SUMMARY OF THE INVENTION

The present invention provides a display apparatus, which can display a natural image as a captured image obtained by capturing a display video.

A display apparatus according to one aspect of the present invention includes a display unit, an acquiring unit configured to acquire a captured image generated by capturing a displayed image, which is displayed by the display unit, by an image pickup apparatus, and a control unit configured to cause the display unit to display the captured image together with or instead of the displayed image. The control unit causes the display unit to stop displaying the captured image when the image pickup apparatus captures the displayed image.

A control method of a display apparatus that includes a display unit according to one aspect of the present invention includes the steps of acquiring a captured image generated by capturing a displayed image, which is displayed by the display unit, with an image pickup apparatus, and causing the display unit to display the captured image together with or instead of the displayed image. When the capturing the displayed image is performed by the image pickup apparatus, the display of the captured image by the display unit is stopped. A non-transitory computer-readable storage medium storing a program that causes a computer of a display apparatus to execute the above control method also constitutes another aspect of the present invention.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

First Embodiment

Figure 1:
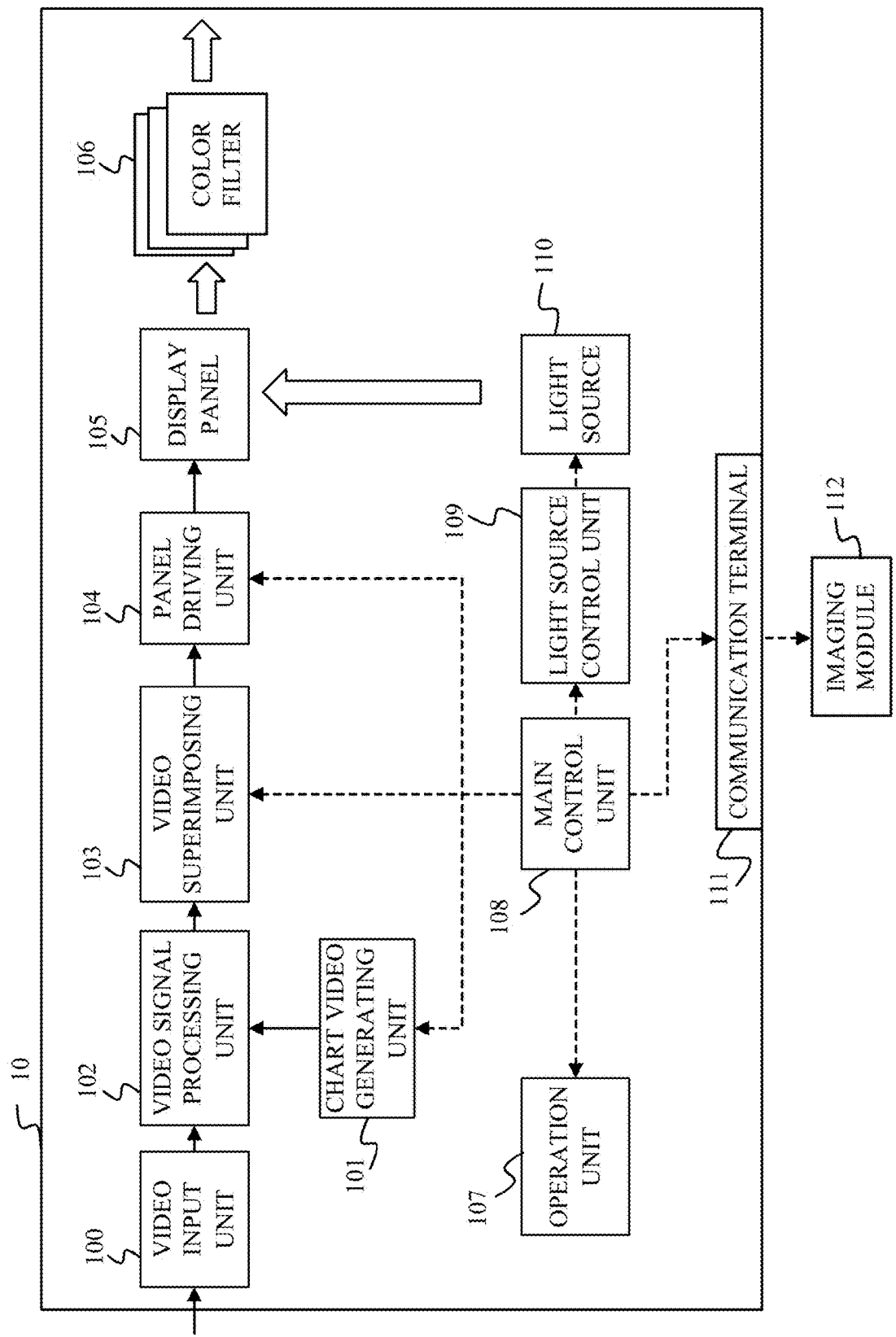
FIG. 1 is a block diagram illustrating a configuration of a direct-view type display apparatus according to a first embodiment.

FIG. 1 illustrates a configuration of a direct-view type display apparatus 10 according to a first embodiment of the present invention. The display apparatus 10 includes a video input unit 100, a chart video generating unit 101, a video signal processing unit 102, an video superimposing unit 103, a panel driving unit 104, a display panel 105, a color filter 106, an operation unit 107, a main control unit 108, a light source control unit 109, a light source 110, and a communication terminal 111. The display apparatus 10 has an unillustrated power supply unit. An external type imaging module (image pickup apparatus) 112 is connected to the display apparatus 10.

The video input unit 100 is an input signal interface, such as HDMI (registered trademark), DVI, analog VGA, and the like. Video signals and audio signals from external video output devices such as PCs (personal computers) and Blu-ray disc players are input via these input signal interfaces.

The chart video generating unit 101 generates a video signal for displaying a chart image at a predetermined frame rate. A chart image displayed by the video signal generated inside the display apparatus 10 includes a pattern image such as a grid pattern and a geometric pattern, a monochromatic image of red, blue, or green, or a mixed color image having a hue of a combination of them, etc.

The video signal processing unit 102 processes a video signal that is input from the outside or internally generated. More specifically, the video signal processing unit 102 determines, after shaping the video signal, the resolution of the video signal based on a data clock frequency and infoframe data. The video signal processing unit 102 sets a display resolution and performs enlargement/reduction (scaling) processing based on the determined resolution. The video signal processing unit 102 also sets a hue and contrast according to the currently set image quality mode and performs image processing such as sharpening processing.

The video superimposing unit 103 generates an OSD (on-screen display) image such as a menu image or an information icon image by graphic drawing, and performs superimposing processing of the OSD (on-screen display) image on the video signal according to an instruction from the main control unit 108. Various settings in the display apparatus 10 can be changed in response to an operation on the operation unit 107 by the user who has viewed the menu (OSD menu) of the OSD image that is displayed in a superimposed state on part of or on a different area from the display video displayed according to the video signal.

The video superimposing unit 103 as an acquiring unit acquires a captured image (still image) generated by imaging by the imaging module 112, from the imaging module 112 connected to the display apparatus 10 via the communication terminal 111.

The main control unit 108 analyzes the captured image and performs various image corrections. For example, in a case where the hue of the display video has changed from that of the shipment from the factory of the display apparatus 10, the main control unit 108 performs hue correction processing. The main control unit 108 performs image correction by setting a correction amount obtained based on the captured image as an image processing parameter of the video signal processing unit 102.

In order to accurately perform various image corrections based on the captured image, the display video (image) displayed by the display apparatus 10 needs to fall within an imaging target range of the imaging module 112. Therefore, the display apparatus 10 has an imaging view mode for the user to confirm an image generated by imaging by the imaging module 112. In a case where the imaging view mode is activated, processing of superimposing a signal of a captured image on a video signal (referred to as captured image superimposing processing hereinafter) is performed in response to an instruction from the main control unit 108. Displaying the captured image on part of the display video in a superimposed state or on a different area from the display video enables the user to confirm whether the display screen of the display apparatus 10 falls within the imaging target range by the imaging module 112. The OSD image or the captured image may not be displayed together with the display video as described above but may be displayed independently instead of the display video.

The display panel 105 as a display unit is a liquid crystal panel in which a liquid crystal is enclosed between transparent substrates. The panel driving unit 104 is a driving circuit that controls a tilt of a liquid crystal molecule by applying a voltage to it and adjusts a light transmitting amount from the light source 110. The light transmission through the display panel 105 passes through the color filter 106 and is emitted as colored light such as the three primary colors of red, green, and blue. A self-luminous panel such as an organic EL panel or a plasma panel may be used as the display panel 105, and in this case, the light source 110 is unnecessary.

The operation unit 107 serves to accept operations by the user. The operation unit 107 includes an operation button provided on an outer surface of the display apparatus 10, a touch panel, a light receiving unit of a remote controller, or the like, and notifies the main control unit 108 of information according to the user operation. The main control unit 108 can receive an information notification according to the user operation by serial communication, network communication, or the like via the communication terminal 111.

The main control unit 108 as a control unit includes a CPU, a memory, and the like, and controls the entire operation of the display apparatus 10 and the imaging module 112.

The light source 110 is a backlight LED disposed on a back surface side of the display panel 105, and a light emitting state such as turning on and off and blinking is controlled according to an instruction from the light source control unit 109.

An external device such as an external control apparatus and an imaging module 112 is communicably connected to the communication terminal 111. The communication terminal 111 can use a USB terminal, an RS-232C standard serial terminal, an RJ-45 terminal compatible with an Ethernet cable, and the like. In addition to these wired communication terminals, modules compatible with wireless communication such as Wi-fi (registered trademark) and Bluetooth (registered trademark) may be provided.

The imaging module 112 performs imaging based on an imaging condition such as an exposure condition, a shutter speed, and gain according to an instruction from the main control unit 108, and generates a captured image. The imaging module 112 transmits data of the captured image to the main control unit 108 via the communication terminal 111 in response to a request from the main control unit 108. This embodiment uses the imaging module 112 for calibration of the display apparatus 10 (such as correction of a color change over time). This embodiment uses a USB camera connectible to the display apparatus 10 by a USB cable for the imaging module 112.

Figure 2:
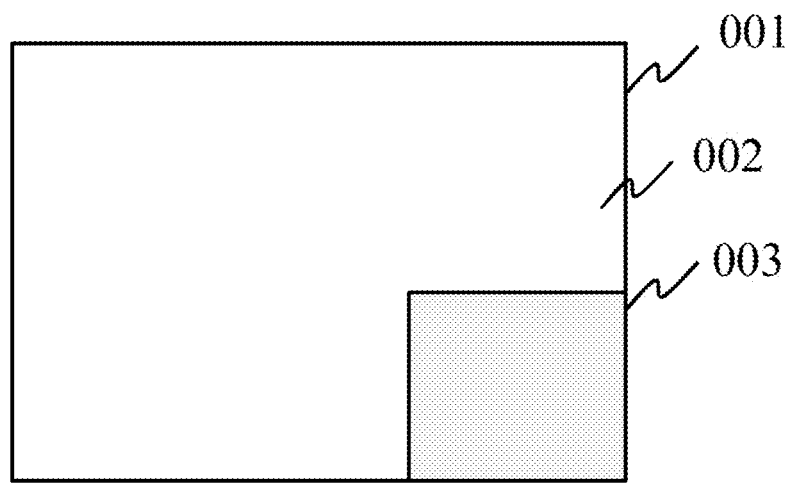
FIG. 2 illustrates an imaging view mode in the display apparatus according to the first embodiment.

The above calibration processing needs to point the imaging module 112 toward the display screen of the display apparatus 10 and to maintain the entire display screen within the imaging range. Now assume that the imaging module 112 does not have a display unit that enables a user to confirm a captured image, and no display apparatus other than the display apparatus 10 for the calibration is prepared. In this environment, the user sets the imaging view mode to the display apparatus 10 in order to confirm whether the imaging module 112 correctly captures the entire display screen. More specifically, the user can set the imaging view mode by operating the button on the operation unit 107, by operating a remote controller, or by selecting the imaging view mode from the OSD menu. In the imaging view mode, the video superimposing unit 103 performs image superimposing processing. Thereby, for example, as illustrated in FIG. 2, a display video corresponding to a video signal is displayed in a large display area 002 in a display screen 001 of the display apparatus 10, and a captured image obtained from the imaging module 112 is displayed in a small display area 003 in a display screen 001 of the display apparatus 10. The display video displayed in the display area 002 may be a video corresponding to a video signal from the outside or a chart video described above.

In the imaging view mode, the main control unit 108 performs control so as to temporarily stop the imaging superimposing processing when the main control unit 108 instructs the imaging module 112 to capture an image. Thereby, the captured image in the display area 0003 is no longer displayed, and the display video is displayed on the entire display screen 001. In this state, the main control unit 108 causes the imaging module 112 to perform imaging within one frame period of the video signal in synchronization with the frame of the video signal (displayed video). For example, In a case where the video signal is a signal having 60 frames per second, the main control unit 108 instructs the imaging module 112 on imaging so that the imaging is performed within a period of one frame out of the 60 frames. The period during which the imaging is performed may be longer than one frame period as long as a disappearance of the captured image from the display area 003 is not easily visually recognizable by the user.

The main control unit 108 executes (resumes) the captured image superimposing processing when the imaging is performed by the imaging module 112 within one frame and taking in the captured image from the imaging module 112 is completed. Thereby, the captured image is displayed again in the display area 003. While the imaging view mode is set, the above processing is repeated at a predetermined cycle (periodically every time the predetermined number of frames is counted).

Figure 3:
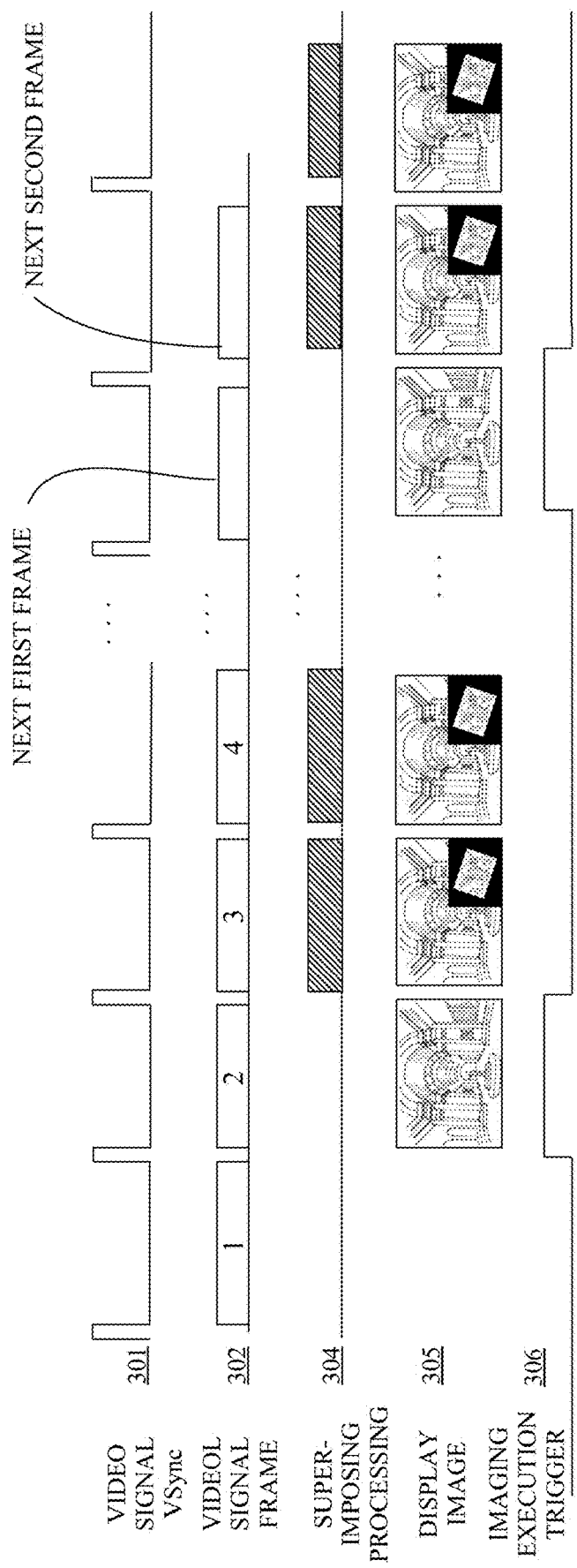
FIG. 3 is a timing chart illustrating processing in the display apparatus according to the first embodiment.

In FIG. 3, reference numeral 301 denotes a vertical synchronization signal of a video signal, and reference numeral 302 denotes a frame of the video signal. Reference numeral 306 denotes an imaging period in which the imaging module 112 performs imaging according to an imaging instruction (imaging execution trigger) given by the main control unit 108, and reference numeral 304 denotes an execution period (hatched part) in which the captured image superimposing processing is performed, and a nonexecution period in which the captured image superimposing processing is not performed. Reference numeral 305 denotes images displayed on the display screen 001 for each frame.

The main control unit 108 gives the imaging execution trigger to the imaging module 112 such that imaging is performed within one frame period every predetermined number of frames, and causes the video superimposing unit 103 to stop the captured image superimposing processing (prevents the video superimposing unit 103 from performing the captured image superimposing processing) in the frame in which imaging is performed. More specifically, in Frame 2 in FIG. 3, a captured image generated by imaging in the past is not displayed on the display screen, and the imaging module 112 performs the imaging while only the display video is displayed.

When the imaging in Frame 2 is completed, the main control unit 108 takes in the captured image from the imaging module 112, and causes the video superimposing unit 103 to perform the captured image superimposing processing using a captured image generated by imaging in Frame 2 over two frames of the next Frame 3 and the next Frame 4. Thereby, the display video and the captured image are displayed on the display screen in these two frames. From this, the main control unit 108 repeats the same processing as that from Frame 2 to Frame 4.

Figure 4A:
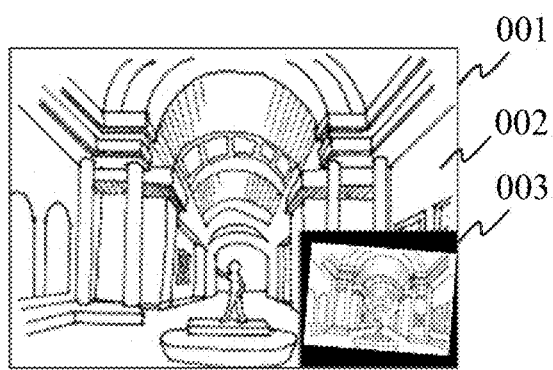
FIGS. 4A and 4B illustrate a difference in display depending on whether or not there is processing according to the first embodiment.
Figure 4B:
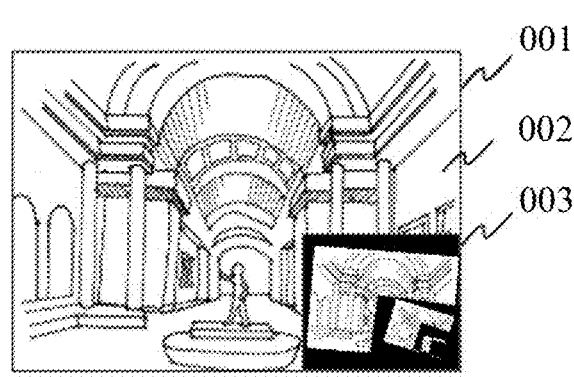

FIG. 4B illustrates a display video displayed in the display area 002 in the display screen 001 and a captured image generated by the latest imaging and displayed in the display area 003, in a case where the above processing is not performed. The latest captured image is an unnatural image in which past captured images obtained by repetitive imaging and displays are superimposed. It is difficult for the user to confirm whether the display screen is within the imaging range based on this captured image.

On the other hand, FIG. 4A illustrates the display video displayed in the display area 002 in the display screen 001, and a captured image generated by the latest imaging and displayed in the display area 003, in a case where the above processing is performed. The latest captured image is a natural image that does not include the past captured images. This allows the user to easily determine whether the display screen is within the imaging range.

As described above, this embodiment enables the user to confirm the imaging range of the imaging module 112 without using a display apparatus other than the display apparatus 10 and without displaying an unnatural captured image.

Figure 5:
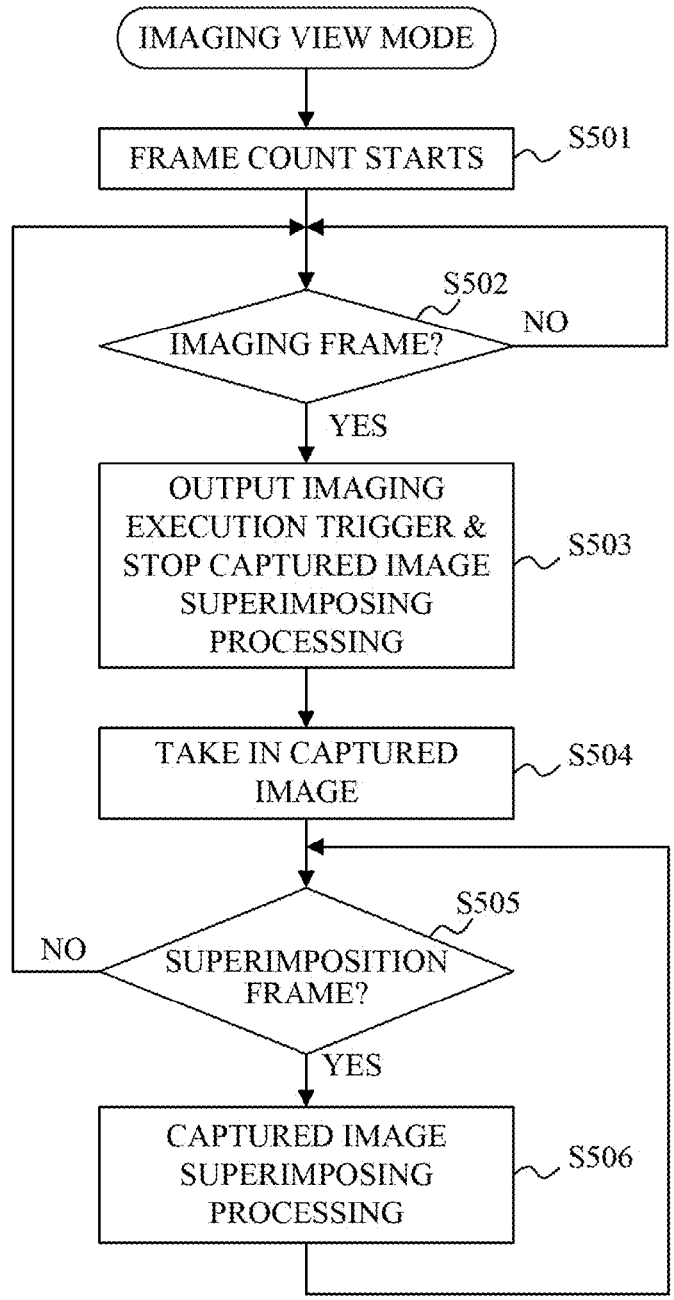
FIG. 5 is a flowchart illustrating processing according to the first embodiment.

A flowchart of FIG. 5 illustrates specific processing executed by the main control unit 108 in order to enable the processing in the imaging view mode described with reference to FIG. 3. The main control unit 108 as a computer executes this processing according to a computer program.

When the imaging view mode starts, the main control unit 108 starts counting the number of frames in the display video in the step S501.

Next, in the step S502, the main control unit 108 determines whether or not the next frame being counted is an imaging frame that requires the imaging module 112 to perform imaging. If it is not the imaging frame (that is, if it is a superimposition frame for the captured image superimposing processing), this determination is repeated, and if it is the imaging frame, the flow proceeds to the step S503.

In the step S503, the main control unit 108 outputs the imaging execution trigger to the imaging module 112, and causes the video superimposing unit 103 to stop the captured image superimposing processing. Thereby, the imaging module 112 performs imaging while the captured image is not displayed on the display screen and only the display video corresponding to the image signal is displayed.

Then, in the step S504, the main control unit 108 takes in the captured image from the imaging module 112.

Next, in the step S505, the main control unit 108 determines whether or not the next frame is a superimposition frame. If it is the superimposed frame, the flow proceeds to the step S506.

In the step S506, the main control unit 108 causes the video superimposing unit 103 to perform the captured image superimposing processing on the display video. Then, the flow returns to the step S505. If the next frame is also a superimposition frame in the step S505, the main control unit 108 causes the video superimposing unit 103 to perform the captured image superimposing processing in the step S506. If the next frame is not the superimposition frame in the step S505, the flow returns to the step S502.

In this way, the main control unit 108 controls the video superimposing unit 103 and the imaging module 112 so that the image superimposing processing is not performed in the imaging frame, in other words, the imaging is not performed in the superimposition frame.

In this embodiment, the main control unit 108 controls the imaging module 112 by instructing the imaging module 112 to perform imaging, and stops the captured image superimposing processing. Alternatively, the imaging module 112 may notify the main control unit 108 that the imaging is to be performed in the next imaging frame, and the main control unit 108 receiving this notification may cause the captured image superimposing processing to be stopped in the next imaging frame.

Second Embodiment

Figure 6:
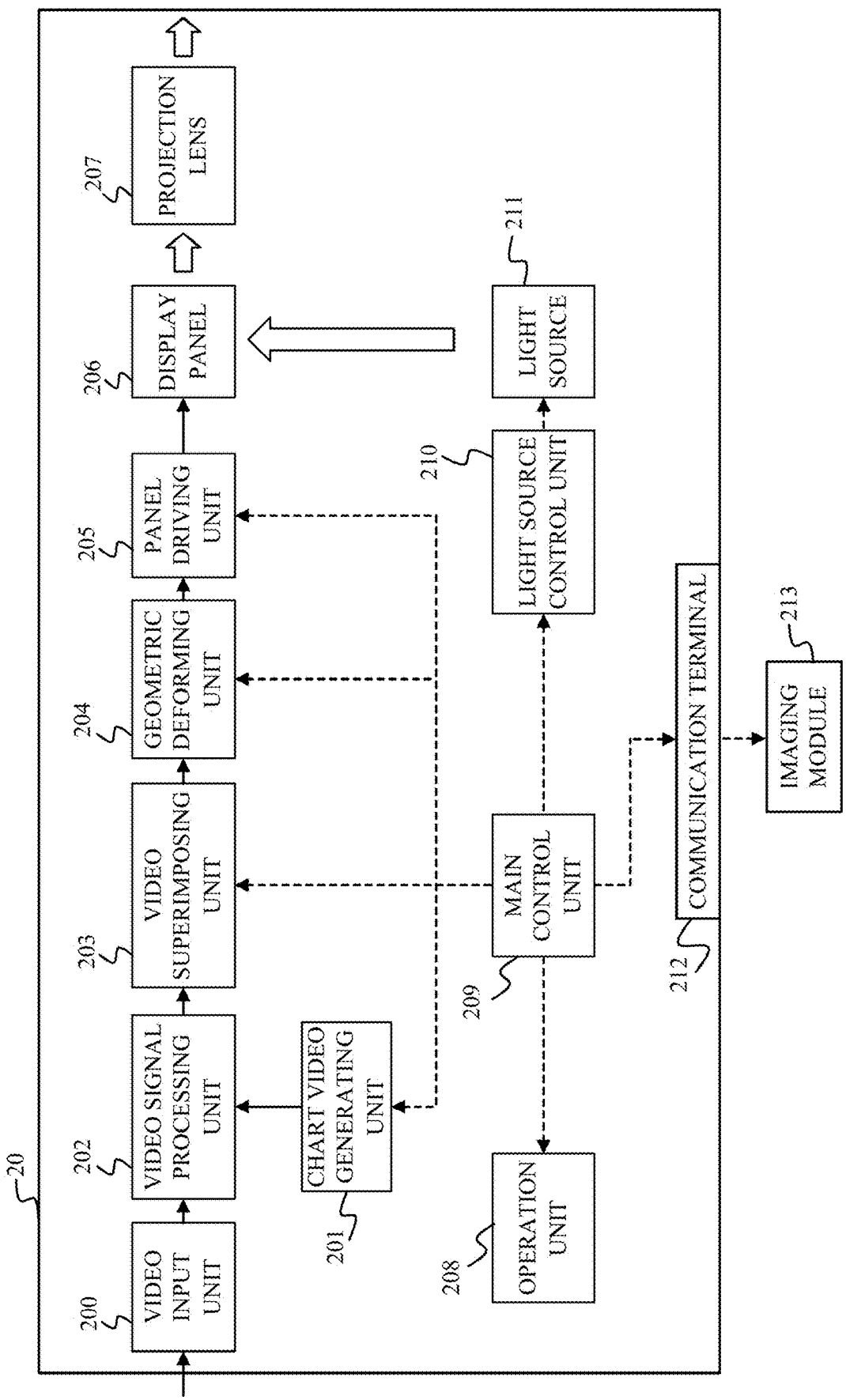
FIG. 6 illustrates a configuration of a projector according to a second embodiment.

FIG. 6 illustrates a configuration of an image projection apparatus (projector) 20 as a display apparatus according to a second embodiment of the present invention. The projector 20 includes a video input unit 200, a chart video generating unit 201, a video signal processing unit 202, an image superimposing unit 203 as an acquiring unit, a geometric deforming unit 204, a panel driving unit 205, a display panel 206, and a projection lens 207. The projector 20 further includes an operation unit 208, a main control unit 209, a light source control unit 210, a light source 211, a communication terminal 212, and an unillustrated power supply unit. An external type imaging module (image pickup apparatus) 213 is connected to the projector 20.

Those elements in this embodiment which have the same names as those of the first embodiment are similar to those of the first embodiment except for part of them, and only differences from them in the first embodiment will be described below. In this embodiment, the imaging module 213 may be a built-in (integrated) type instead of an external type.

The geometric deforming unit 204 performs thinning processing of pixels from a partial area in an image (display video or captured image) to be displayed on the display panel 206 and processing of electrically deforming an image by moving a drawing start position of the image. The geometric deforming unit 204 can perform uniform deformation processing for all colors of the image or deformation processing for only part of colors.

The light source 211 includes a discharge tube such as an ultra-high pressure mercury lamp and a halogen lamp or a solid light source such as a laser light source and an LED. The light source control unit 210 controls turning on and off of the light source 211 and a light emission amount.

The display panel 206 as a display unit includes a transmission or reflection type liquid crystal panel or a digital micromirror device.

The projection lens 207 displays a projected image by projecting the light that has transmitted through or has been reflected on the display panel 206 onto a projection surface such as a screen or a wall. The projection lens 207 can adjust a projection angle of view, a projection position (shift position), and a focus position. The projection lens 207 may be interchangeable.

The thus configured projector 20 projects an image onto a projection surface away from the projector 20. The projector 20 may project an image from an oblique direction to the projection surface, or the projection surface may have a color other than white. It is thus necessary to correct the shape and color of the projected image using the captured image obtained by the imaging module 213, and for that purpose, it is necessary to set an imaging range of the imaging module 213 so that it can accommodate the entire projected image. The projector 20 according to this embodiment also has an imaging view mode similar to that of the first embodiment. The main control unit 209 as a control unit can analyze the captured image and perform various image corrections.

The processing executed by the main control unit 209 in the imaging view mode is processing similar to that executed by the main control unit 108 in the first embodiment. That is, the main control unit 209 causes the captured image superimposing processing to be stopped when the main control unit 209 causes the imaging module 213 to perform imaging. Specific processing executed by the main control unit 209 is also the same as that illustrated in the flowchart of FIG. 5.

Even this embodiment enables the user to confirm the imaging range of the imaging module without using a display apparatus other than the projector 20 and without displaying an unnatural captured image.

Third Embodiment

In the first and second embodiments, the imaging module is made to periodically perform imaging, but the imaging module may perform imaging at a timing when there is a change relating to a display video in addition to the periodic timing. A description will now be given of a projector according to a third embodiment of the present invention. The projector according to this embodiment is the same as that of the projector 20 according to the second embodiment.

In the imaging view mode, a format of a video signal input to the video input unit 200 may change, or an image quality mode or aspect ratio may be changed by the user through the OSD menu. Further, an angle of view and a shift position of the projection lens 207 may be changed, or an input video signal may be changed to a video signal of a chart video generated by the chart video generating unit 201. In the case where the change relating to the display video occurs as described above, the main control unit 209 instructs the imaging module 213 to capture an image and the image superimposing unit 203 to temporarily stop the captured image superimposing processing.

Figure 7B:
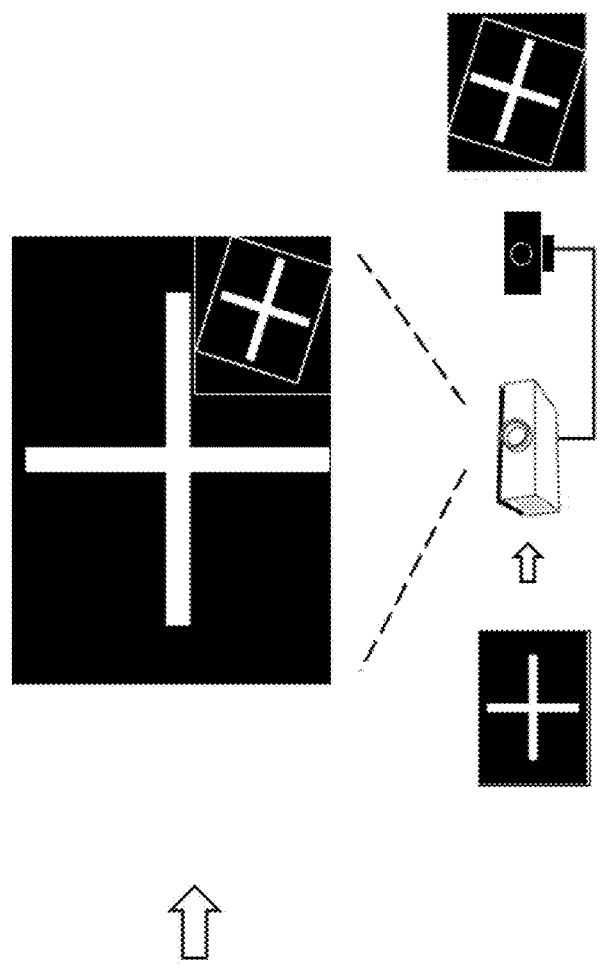
FIGS. 7A and 7B illustrate a display by the projector according to the second embodiment.
Figure 7A:
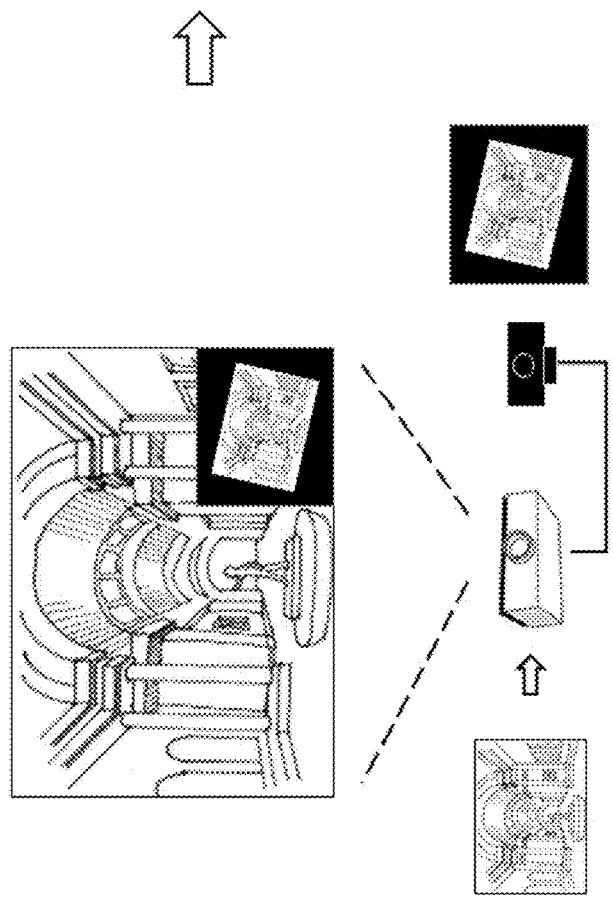

For example, in the imaging view mode, in a case where a projection of a display video corresponding to an input video signal as illustrated in the lower left of FIG. 7A is switched to a projection of a cross chart video as illustrated in the lower left of FIG. 7B, imaging is instructed and the captured image superimposing processing is prevented. After the imaging is performed, the captured image superimposing processing is resumed. Thereby, an image as illustrated at the top of FIG. 7B is projected.

Specific processing executed by the main control unit 209 includes an unillustrated step A between the steps S501 and S502 in FIG. 5, in which the main control unit 209 determines whether or not a change relating to a display video has occurred. The flow skips the step S502 and proceeds to the step S503 in a case where the change has occurred, and the flow proceeds to the step S502 in a case where no change has occurred.

This embodiment automatically enables the user to confirm the imaging range of the imaging module when a change relating to a display video occurs.

Fourth Embodiment

In the case where the change relating to the display video described in the third embodiment occurs a plurality of times in a short time and imaging by the imaging module 213 and captured image superimposing processing by the image superimposing unit 203 are performed for each change, unnecessary imaging and captured image superimposing processing may be performed.

Therefore, in the case where the change relating to the display video occurs a predetermined number of times within a predetermined time, the main control unit 209 may control the imaging module 213 and the image superimposing unit 203 so as to stop imaging and captured image superimposing processing. The predetermined time is, for example, 5 seconds or 10 seconds. The predetermined plurality of times is, for example, two times or three times.

If the predetermined time elapses after the imaging and the captured image superimposing processing are stopped and there is no change relating to the display video during that period, the main control unit 209 may cause the imaging module 213 to resume periodical imaging and the image superimposing unit 203 to resume captured image superimposing processing.

Specific processing executed by the main control unit 209 includes an unillustrated step B to which the flow proceeds in a case where the change relating to the display video occurs in the step A described in the second embodiment, in which the main control unit 209 determines whether or not there have been a predetermined number of changes within the predetermined time. In the case where there have been a predetermined number of changes within a predetermined time, the flow proceeds to an unillustrated step C that stops imaging by the imaging module 213 and captured image superimposition processing. The main control unit 209 then determines whether or not there is a change relating to the display video within a predetermined time in an unillustrated step D, and if no change has occurred, the flow proceeds to the step S502. In the step B, in the case where a predetermined number of changes have not occurred within the predetermined number of times, the flow also proceeds to the step S502.

This embodiment can avoid waste imaging and captured image superimposing processing in the case where a change relating to a display video occurred a plurality of times in a short period, and can execute imaging and image superimposing processing while the display image becomes stable.

Other Embodiments

Embodiment(s) of the present invention can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Each embodiment can display a natural image as a captured image obtained by capturing the display video.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-083177, filed on May 17, 2021, which is hereby incorporated by reference herein in its entirety.

What is claimed is:

1. A display apparatus comprising:
a display unit configured to display an input signal image based on a video signal input from an outside;
an acquiring unit configured to acquire a captured image generated by capturing the input signal image by an image pickup apparatus; and
a control unit configured to cause the display unit to display the captured image together with the input signal image based on the video signal or to display the captured image instead of the input signal image based on the video signal,
wherein the control unit causes the display unit to stop displaying the captured image when a control for causing the image pickup apparatus to capture the input signal image is performed.

2. The display apparatus according to claim 1, wherein the control unit causes the display unit to stop displaying the captured image in an imaging frame in which the imaging is performed among frames of the displayed image, and to display the captured image in a frame other than the imaging frame.

3. The display apparatus according to claim 1, wherein the control unit causes the image pickup apparatus to perform the capturing at a predetermined cycle.

4. The display apparatus according to claim 1, wherein the control unit causes the image pickup apparatus to perform the capturing when a change relating to the displayed image occurs.

5. The display apparatus according to claim 4, wherein the control unit causes the image pickup apparatus to stop the capturing when the change relating to the displayed image occurs a predetermined number of times within a predetermined time, and after the image pickup apparatus stops the capturing, causes the image pickup apparatus to resume the capturing after the change relating to the displayed image stops.

6. The display apparatus according to claim 1, wherein the display unit displays a generated image based on an inner video signal generated inside the display apparatus.

7. A control method of a display apparatus that includes a display unit configured to display an input signal image based on a video signal input from an outside, the control method comprising the steps of:
acquiring a captured image generated by capturing the input signal image by an image pickup apparatus; and
causing the display unit to display the captured image together with the input signal image based on the video signal or to display the captured image instead of the input signal image based on the video signal,
wherein when a control for causing the image pickup apparatus to capture the input signal image is performed, the display of the captured image by the display unit is stopped.

8. A non-transitory computer-readable storage medium storing a program that causes a computer of a display apparatus to execute the control method according to claim 7.

* * * * *